US012802337B2

(12) United States Patent
Deng et al.

(10) Patent No.: US 12,802,337 B2
(45) Date of Patent: Nov. 17, 2026

(54) METHOD FOR INTEGRAL IMAGING ELEMENTAL IMAGE ARRAY GENERATION BASED ON OPTIMAL VOXEL SPACE DISTRIBUTION

(71) Applicant: Sichuan University, Chengdu (CN)

(72) Inventors: Huan Deng, Chengdu (CN); Zesheng Liu, Chengdu (CN); Dahai Li, Chengdu (CN)

(73) Assignee: Sichuan University, Chengdu (CN)

( * ) Notice: Subject to any disclaimer, the term of this patent is extended or adjusted under 35 U.S.C. 154(b) by 100 days.

(21) Appl. No.: 19/015,289

(22) Filed: Jan. 9, 2025

(65) Prior Publication Data

US 2025/0232517 A1 Jul. 17, 2025

(30) Foreign Application Priority Data

Jan. 16, 2024 (CN) ......................... 202410060799.7

(51) Int. Cl.

*G06T 15/00* (2011.01)
*G06T 3/40* (2006.01)
*G06T 7/40* (2017.01)
*G06T 7/50* (2017.01)
*G06T 15/04* (2011.01)
*G06T 15/08* (2011.01)

(52) U.S. Cl.

CPC ................ *G06T 15/08* (2013.01); *G06T 3/40* (2013.01); *G06T 7/40* (2013.01); *G06T 7/50* (2017.01); *G06T 15/04* (2013.01)

(58) Field of Classification Search

None

See application file for complete search history.

(56) References Cited

U.S. PATENT DOCUMENTS

| | | | | |
|---|---|---|---|---|
| 8,542,933 | B2 * | 9/2013 | Venkataraman ........ | G06T 15/08 382/233 |
| 2003/0156746 | A1 * | 8/2003 | Bissell .................... | G06T 15/08 382/128 |
| 2012/0313942 | A1 * | 12/2012 | Chen ....................... | G06T 15/08 345/424 |
| 2013/0077880 | A1 * | 3/2013 | Venkataraman ........ | G06T 15/08 382/232 |
| 2020/0211280 | A1 * | 7/2020 | Cohen ....................... | G06T 7/11 |
| 2020/0279438 | A1 * | 9/2020 | Ohashi ................. | H04N 13/111 |
| 2020/0288102 | A1 * | 9/2020 | Um ......................... | G06T 15/10 |

(Continued)

*Primary Examiner* — Martin Mushambo

(74) *Attorney, Agent, or Firm* — Corner Counsel, LLC

(57) ABSTRACT

A method for integral imaging elemental image array generation based on optimal voxel space distribution is provided. The method includes: acquiring depth data and texture data of a 3D scene; according to the relationship between a voxel space of an integral imaging 3D display and the 3D display performance, selecting a part of the voxel space that meets 3D display performance requirements from the entire voxel space of the integral imaging 3D display as the optimal voxel space; inputting the acquired depth data and texture data of the 3D scene, and synthesizing the elemental image array that meets the display performance requirements of the integral imaging 3D display according to the selected optimal voxel space. The method can obtain depth data and texture data through mature technologies and products of the prior art, and no longer relies on its own structure of an integral imaging display system.

4 Claims, 12 Drawing Sheets

(56) References Cited

U.S. PATENT DOCUMENTS

2020/0327722 A1* 10/2020 Jones ...................... G06T 15/08
2021/0158561 A1* 5/2021 Park ....................... B25J 9/1612
2021/0400249 A1* 12/2021 Edmonds .................. G06T 7/40
2023/0039065 A1* 2/2023 Dascal ................. A61B 8/5246

* cited by examiner (a) $P(16)$ (b) $P(21)$ (c) $P(24)$ (d) $P(27)$

METHOD FOR INTEGRAL IMAGING ELEMENTAL IMAGE ARRAY GENERATION BASED ON OPTIMAL VOXEL SPACE DISTRIBUTION

CROSS-REFERENCE TO RELATED APPLICATIONS

This application claims priority under 35 U.S.C. § 119(a) to Chinese Patent Application No. 202410060799.7, filed on Jan. 16, 2024, which is hereby incorporated by reference herein in its entirety.

TECHNICAL FIELD

The present disclosure relates to the technical field of integral imaging, and in particular to a method for integral imaging elemental image array generation based on optimal voxel space distribution.

BACKGROUND ART

Integral imaging 3D display is a type of naked-eye 3D display. Compared with glasses-free or head-mounted 3D display in the prior art, the integral imaging 3D display, without need of any auxiliary equipment, is capable of presenting 3D images protruding or recessed from a display screen, just like an ordinary TV or monitor. Structurally, the integral imaging 3D display is achieved by precisely coupling a conventional 2D display screen (such as a liquid crystal screen (LCD) or a projection screen) and a specially designed optical device (a micro-lens array) attached thereto.

The integral imaging 3D display requires a unique 3D image source, and the image source is usually composed of multiple tiny images subject to interlaced arrangement of pixels, and also known as an elemental image array. The integral imaging usually only relies on its own complex device to capture 3D scenes, and then the elemental image array is synthesized through algorithmic processing. This process is also called a 3D image source generation process. Additionally, there are certain limitations on a depth range of 3D scenes to be captured, because the 3D images reconstructed by the integral imaging can only protrude or recess within a very small range in front of or behind the display screen. The depth usually ranges from a few centimeters to tens of centimeters. Images beyond this range will become blurred and even seriously affect the viewing experience. However, any real-world 3D scene may have a large depth range, which makes it difficult to capture and display the real-world 3D scenes through the integral imaging technology in the prior art, such that scarcity in 3D image sources poses a challenge to the integral imaging. At present, most integral imaging 3D image sources used for academic research or commercial display are 3D modeled by computer software. A virtual micro-lens array or a virtual camera array is set through a computer for capturing, and then images are synthesized through a compositing program.

In the prior art, to generate an integral imaging 3D image source, cameras (real or virtual) are usually arranged in an orderly array manner to capture a 3D scene from multiple different angles. Each camera captures an image of the 3D scene from a specific angle, and then pixel encoding of the images is performed through a program to generate a 3D image source. However, this method has defects in that the camera array is structurally complex and requires a complex calibration and synchronization mechanism, thus making it difficult to achieve commercialization. According to another method, a light field camera is used to capture images, but has a too low resolution, such that any reconstructed 3D image has poor quality. In recent years, some researchers have proposed to capture RGB-D images (including texture+depth data of a 3D scene) through a depth camera, and then to synthesize the images through a computer image processing method according to mapping relations between 3D image points and voxels on the display screen. This method eliminates the dependency of the integral imaging 3D image source generation on its own structure, which makes acquisition of the image source more universal, but fails to unify capture and display processes. Moreover, according to specific requirements, a depth range of the 3D scene cannot exceed a DOF (Depth of Field) range of a 3D display, otherwise the displayed 3D images will become very blurred. Obviously, this method is difficult to apply widely.

Therefore, the present disclosure provides a multi-source and universal method for generating an integral imaging elemental image array to solve the problems of the prior art including difficulty of application and promotion due to scarcity of elemental image arrays (3D image sources) for integral imaging.

SUMMARY

An objective of the present disclosure is to provide a multi-source and universal method for generating an integral imaging elemental image array to solve the problems of the prior art including difficulty of application and promotion due to scarcity of elemental image arrays (3D image sources) for integral imaging. The multi-source is reflected in that acquisition of depth data and texture data no longer relies on its own structure of an integral imaging display system, but a set of common RGB-D images can be obtained through mature technologies and products of the prior art such as a depth camera and 3DS MAX software; and the universal is reflected in that the method provided in the present disclosure can flexibly adjust a resolution of the acquired depth data and texture data through an optimal voxel space to adapt to integral imaging 3D displays with different specifications and parameters.

The principle of integral imaging 3D display is illustrated in FIG. 1, where a magic cube represents a virtual 3D image reconstructed by an integral imaging display device, and it can be deemed that the virtual 3D image is composed of voxel units. According to the principle that optical paths in capture and display processes of integral imaging are reversible, each voxel in the 3D image corresponds to a set of pixel points (also called homologous pixel points) in an elemental image array. In a 3D display process, light beams emitted by a set of homologous pixel points, after being refracted by respective micro-lenslets in front of them, are converged into an image point at a certain position in space, and the image point is a voxel of the 3D image. If the light beam of each pixel is deemed as a principal ray and a lenslet is deemed as a pinhole imaging model, a spatial position of the voxel is an intersection of the principal rays emitted from a plurality of the homologous pixel points in space.

The technical solution of the present disclosure is as follows:

A method for integral imaging elemental image array generation based on optimal voxel space distribution, where the method includes the following steps:

S1, acquiring depth data and texture data of a 3D scene;

S2, selecting an optimal voxel space: according to a relationship between a voxel space of an integral imaging 3D display and 3D display performance, selecting a part of the voxel space that meets 3D display performance requirements from the entire voxel space of the integral imaging 3D display as the optimal voxel space; and S3, synthesizing an elemental image array: inputting the acquired depth data and texture data of the 3D scene, and synthesizing the elemental image array that meets the display performance requirements of the integral imaging 3D display according to the selected optimal voxel space.

Further, the selecting of an optimal voxel space includes the following sub-steps:

S2-1, discarding the integral image planes with missing voxels from the entire voxel space of the integral imaging 3D display;

S2-2, roughly selecting the integral image planes with a relatively high voxel space resolution according to a position of a central depth plane; and S2-3, on the basis of the S2-2, selecting apart of the voxel space that meets the performance requirements as the optimal voxel space, according to 3D DOF (Depth of Field) requirements of the integral imaging 3D display and a degree of overlap between adjacent voxels.

Further, the synthesizing of an elemental image array includes the following sub-steps:

S3-1, transforming the acquired depth data of the 3D scene into a depth range corresponding to the optimal voxel space, and segmenting the acquired depth data of the 3D scene into a plurality of integral image planes corresponding to the optimal voxel space;

S3-2, segmenting the acquired texture data of the 3D scene and pasting them on each integral image plane, and adjusting the space resolution of the texture data of the 3D scene on each integral image plane to the voxel space resolution of a corresponding integral image plane through upsampling or downsampling, i.e., generating a texture slice image on the corresponding integral image plane;

S3-3, according to mapping relations between the voxels and the homologous pixel points, mapping the texture slice image on each integral image plane to an elemental image array plane point by point, to generate a sub-elemental-image-array corresponding to each integral image plane; and S3-4, extending the sub-elemental-image-array corresponding to each integral image plane in a hole direction according to a relationship between parallax (in pixels) and depth (to avoid image quality degradation caused by the holes), and fusing the extended sub-elemental-image-array to generate a complete elemental image array.

Further, the selecting of an optimal voxel space includes the following sub-steps:

S2-1, the discarding of an integral image plane with missing voxels from the entire voxel space of the integral imaging 3D display, specifically including:

establishing a world coordinate system with a geometric center of a micro-lens array plane as an origin, where an X-Y plane coincides with the micro-lens array plane, and a Z axis is perpendicular to the micro-lens array plane; assuming that each image element contains R×R pixels (i.e., R pixels in both horizontal and vertical directions respectively), each image element will emit R×R reconstructed rays, and the reconstructed rays propagate in a 3D image space at a same angular interval, where an angular interval of adjacent reconstructed rays is expressed as:

$$\Delta\theta = \arctan\left(\frac{p_d}{g}\right), \tag{1-1}$$

where g is a distance between a pixel plane and the micro-lens array plane, and $p_d$ is a size of pixels on a 2D display screen;

the reconstructed rays emitted by a pixel in any image element intersect with each reconstructed ray from its adjacent image element, which forms at most $(R-1)^2$ voxels, and the voxels are distributed at R−1 different depth positions, so a total number of integral image planes carrying all voxels is expressed as:

$$N_p = R - 1; \tag{1-2}$$

assuming that a $k^{th}$ ($1 \le k \le N_p$) integral image plane is P(k), its distance z(k) from the micro-lens array plane is expressed as:

$$z(k) = \frac{pg}{p - kp_d} = \frac{gR}{R-k}, \tag{1-3}$$

where p represents the pitch of a lenslet;

a spacing Δz(k) between adjacent integral image planes is expressed as:

$$\Delta z(k) = (k+1) - z(k); \tag{1-4}$$

assuming that Δx(k) and Δy(k) represent spacings between adjacent voxels on the integral image plane P(k) in horizontal and vertical directions respectively, then:

$$\Delta x(k) = \Delta y(k) = \frac{z(k)p_\Delta}{g} = \frac{p}{R-k}; \tag{1-5}$$

a set of voxels formed by the intersection of the reconstructed rays from two adjacent image elements are distributed in a rectangular pyramid shape, some areas are unevenly distributed due to lack of some voxels, and the number of integral image planes where voxels are not distributed uniformly is calculated according to a geometric relationship:

$$K = \text{round}\left(\frac{R}{2} - 1\right), \tag{1-6}$$

where round(.) means rounding to a nearest integer;

the integral image plane is cropped to a same size as the 2D display screen, and the number of voxels on the cropped integral image plane is expressed as:

$$N_h(k) = \text{round}\left(\frac{W}{\Delta x(k)}\right) \quad (1\text{-}7)$$

and $$N_v(k) = \text{round}\left(\frac{H}{\Delta y(k)}\right), \quad (1\text{-}8)$$

where $N_h(k)$ represents the number of voxels on the cropped integral image plane distributed in a horizontal direction, $N_v(k)$ represents the number of voxels on the cropped integral image plane distributed in a vertical direction, W represents the width of the 2D display screen, and H represents the height of the 2D display screen;

the formulas (1-1)-(1-8) describe all voxel characteristic parameters of the integral imaging 3D display; obviously, reverse extension lines of the reconstructed rays will also form a similar voxel space behind the screen, and the same expression applies to its characteristic parameters and also characteristic parameters of a voxel space in front of the screen;

and the present disclosure completely reveals a voxel space distribution law of the integral imaging 3D display for the first time.

S2-2, the roughly selecting of the integral image planes with a relatively high voxel space resolution according to a position of a central depth plane, specifically including:

assuming that $R_x(k)$ and $R_y(k)$ represent the space resolutions of the voxels on the integral image plane P(k) both in the horizontal and vertical directions respectively, which are expressed as:

$$R_x(k) = \frac{1}{\Delta x(k)} = \frac{R-k}{p} \quad (1\text{-}9)$$

and $$R_y(k) = \frac{1}{\Delta y(k)} = \frac{R-k}{p}; \quad (1\text{-}10)$$

it can be seen from the formulas (1-9) and (1-10) that the voxel space resolution decreases with an increase of the integral image plane number, that is, the voxel space resolution of the integral image plane closer to the micro-lens array plane is higher, and the voxel space resolution of the integral image plane farther away from the micro-lens array plane gradually decreases;

it can be seen from the formulas (1-5), (1-7) and (1-8) that when the parameters of the 2D display screen (including a screen width W of the 2D display screen, a screen height H of the 2D display screen, and a pixel size $p_d$ of the 2D display screen) and the parameters of the lenslet (a pitch p of the lenslet) are determined, the number of voxels on each integral image plane is determined, and a size of the voxels on each integral image plane is related to the position of the central depth plane;

the position of the central depth plane is determined by the Gaussian imaging formula:

$$l = \frac{gf}{g-f}, \quad (1\text{-}11)$$

where l represents the distance from the central depth plane to the micro-lens array plane, and f is the focal length of the lenslet;

therefore, by adjusting a spacing g between the micro-lens array plane and the pixel plane, the central depth plane is arranged near the integral image plane where voxels are denser, and then the integral image plane with a relatively high voxel space resolution is roughly selected according to the position of the central depth plane;

S2-3, on the basis of the S2-2, selecting a part of the voxel space that meets the performance requirements as the optimal voxel space, according to 3D DOF (Depth of Field) requirements of the integral imaging 3D display and a degree of overlap between adjacent voxels, specifically including:

according to the geometric relationship, a size $S_v$ of the voxels on the integral image plane at a distance z from the micro-lens array plane is expressed as:

$$s_v = \frac{|z|}{gR}p + \frac{|z-l|}{l}p; \quad (1\text{-}12)$$

when adjacent voxels are overlapped with each other, their overlap degree β is expressed as:

$$\beta = 1 - \left(\frac{D_v}{S_v}\right), \quad (1\text{-}13)$$

where $D_v$ represents a spacing between the adjacent voxels, which is determined by Δx(k) and Δy(k) in the formula (1-5); given an overlap threshold $\beta_0$, depth positions of integral image planes at front and rear edges of the integral imaging 3D display within a 3D DOF range can be determined; an edge integral image plane closest to a viewer is referred to as a front edge integral image plane, and an edge integral image plane farthest from the viewer is referred to as a rear edge integral image plane; assuming that distances between the front edge integral image plane and the rear edge integral image plane and the micro-lens array plane are $z_1$ and $z_2$, respectively, the 3D DOF of the integral imaging 3D display is expressed as:

$$\Delta z = |z_1 - z_2|; \quad (1\text{-}14)$$

Therefore, based on the S2-2, the front edge integral image plane and the rear edge integral image plane are selected according to 3D DOF requirements of the integral imaging 3D display and the overlap degree between adjacent voxels, such that a 3D image reconstructed between the front edge integral image plane and the rear edge integral image plane always maintains high clarity.

Further, the mapping relationship between the voxels and the homologous pixel points is expressed as:

$$F:Vx \rightarrow HomoPx, \quad (1\text{-}15)$$

where Vx represents a voxel set, HomoPx represents a pixel set, and F represents a mapping function. (For any element in the voxel set Vx, the number of corresponding elements in the pixel set HomoPx represents the number of reconstructed rays that constitute the voxel. Therefore, an area of interest in the 3D scene can be reconstructed on a voxel with more reconstructed rays to obtain denser viewpoints and a smoother motion parallax.)

Further, a method for acquiring depth data and texture data of a 3D scene includes: using a depth camera or 3D modeling software to obtain RGB-D images of the 3D scene, where the RGB-D images include depth data and texture data.

Compared with the prior art, the present disclosure has the following advantages:

1. Acquisition of depth data and texture data: only mature technologies and products in the prior art, such as depth cameras and 3DS MAX software, are needed to provide more general 3D information sources for the integral imaging 3D display, thereby freeing the 3D information acquisition process from dependence on a complex and refined optical structure of integral imaging.
2. Selection of an optimal voxel space: Each integral imaging 3D display with different structural parameters has its own unique voxel space, and a part of the voxel space that best meets 3D display performance requirements is selected, such that a generated elemental image array (a 3D image source) can match each specific integral imaging 3D display, thereby avoiding the compatibility problem that an elemental image array (a 3D image source) in the prior art cannot be displayed on 3D displays with different parameters.
3. Synthesis of elemental image arrays: Any depth data can be flexibly transformed into the depth range of the optimal voxel space, and the space resolution of the texture data can be adjusted to be consistent with the voxel space resolution through the upsampling or the downsampling, such that each voxel can be accurately mapped to a corresponding homologous pixel point.
4. The present disclosure completely reveals a voxel space distribution law of the integral imaging 3D display for the first time.

The present disclosure will be described in detail below with reference to specific embodiments and accompanying drawings, but it is not intended to limit the protection scope of the present disclosure.

DETAILED DESCRIPTION

Example

Figure 1:
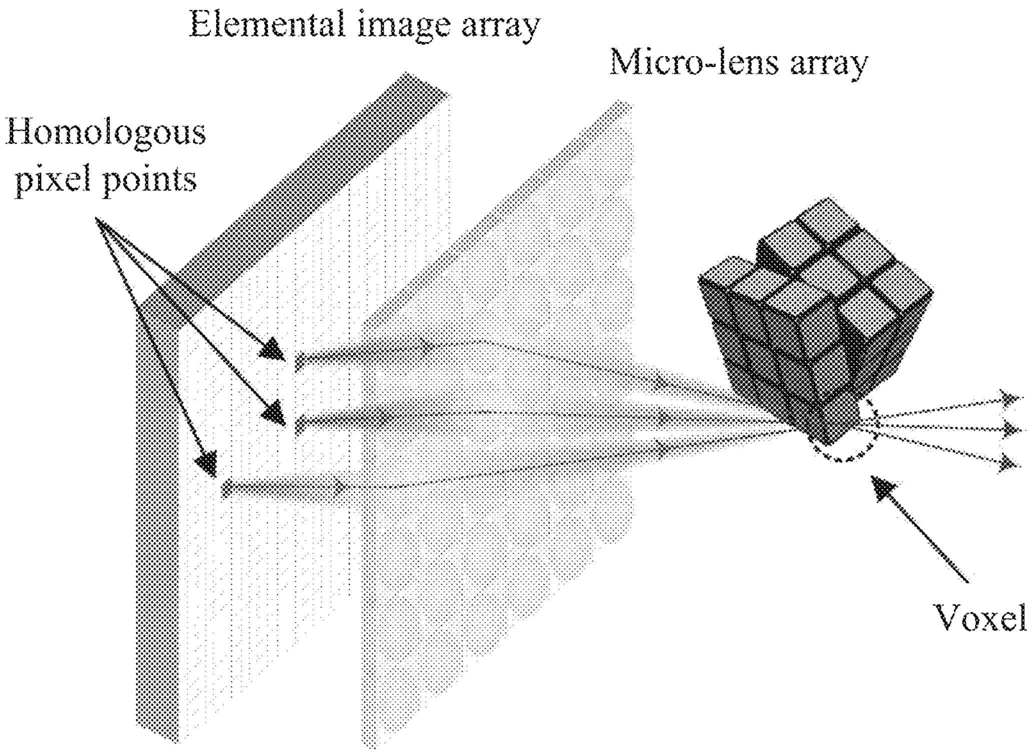
FIG. 1 is a schematic diagram illustrating the working principle of integral imaging 3D display.

In this example, there is provided a method for integral imaging elemental image array generation based on optimal voxel space distribution, and the method includes the following steps:

S1, acquire depth data and texture data of a 3D scene.

In this example, a depth camera or 3D modeling software is used to obtain RGB-D images of the 3D scene, and the RGB-D images include depth data and texture data.

S2, select an optimal voxel space: according to a relationship between a voxel space of an integral imaging 3D display and 3D display performance, select a part of the voxel space that meets 3D display performance requirements from the entire voxel space of the integral imaging 3D display as the optimal voxel space.

In this example, the selecting of an optimal voxel space includes the following sub-steps:

S2-1, discard an integral image plane with missing voxels from the entire voxel space of the integral imaging 3D display, specifically including:

establish a world coordinate system with a geometric center of a micro-lens array plane as an origin, where an X-Y plane coincides with the micro-lens array plane, and a Z axis is perpendicular to the micro-lens array plane; assuming that each image element contains R×R pixels (i.e., R pixels in both horizontal and vertical directions respectively), each image element will emit R×R reconstructed rays, and the reconstructed rays propagate in a 3D image space at a same angular interval, where an angular interval of adjacent reconstructed rays is expressed as:

$$\Delta\theta = \arctan\left(\frac{p_d}{g}\right), \tag{1-1}$$

where g is the distance between a pixel plane and the micro-lens array plane, and $p_d$ is the size of pixels on a 2D display screen; (most display devices adopt square pixels, that is, a pixel aspect ratio is 1:1, and therefore the angular intervals of the reconstructed rays in X-axis and Y-axis directions are equal. The formula (1-1) also applies to displays of non-square pixel structures, and details are not described herein again.)

Figure 2:
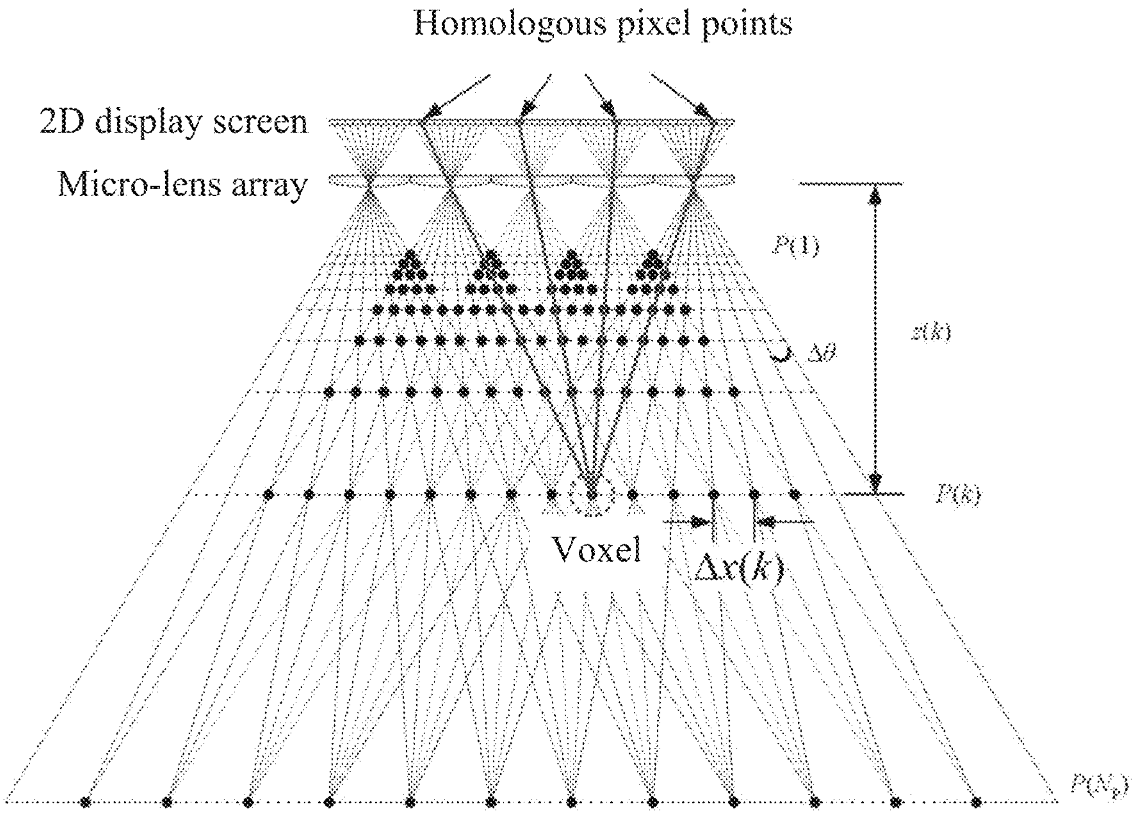
FIG. 2 is a schematic diagram of a voxel space distribution law according to an example of the present disclosure.

The reconstructed rays emitted by a pixel in any image element intersect with each reconstructed ray from its adjacent image element, which forms at most $(R-1)^2$ voxels, and the voxels are distributed at R−1 different depth positions, so a total number of integral image planes carrying all voxels is expressed as:

$$N_p = R - 1; \tag{1-2}$$

assuming that a $k^{th}$ ($1 \le k \le N_p$) integral image plane is P(k), its distance z(k) from the micro-lens array plane is expressed as:

$$z(k) = \frac{pg}{p - kp_d} = \frac{gR}{R - k}, \tag{1-3}$$

where p represents the pitch of a lenslet; (In traditional integral imaging light field acquisition processes, the pitch of the pixel elements is usually equal to the pitch of the lenslet, to maximize the utilization of the pixel units in the elemental image array and avoid overlapping in the boundary areas of adjacent pixel elements.)

a spacing Δz(k) between adjacent integral image planes is expressed as:

$$\Delta z(k) = z(k+1) - z(k); \tag{1-4}$$

assuming that Δx(k) and Δy(k) represent spacings between adjacent voxels on the integral image plane P(k) in horizontal and vertical directions respectively, then:

$$\Delta x(k) = \Delta y(k) = \frac{z(k)\, p_d}{g} = \frac{p}{R - k}; \tag{1-5}$$

a set of voxels formed by the intersection of the reconstructed rays from two adjacent image elements are distributed in a rectangular pyramid shape, some areas are unevenly distributed due to lack of some voxels, (As illustrated in FIG. 2, a top area of the rectangular pyramid indicated by a dashed box in FIG. 2 is unevenly distributed due to the lack of some voxels; and in a bottom area, some voxels in an adjacent rectangular pyramid overlap, such that the voxels in these areas are evenly distributed on each integral image plane) and the number of integral image planes where voxels are not distributed uniformly is calculated according to a geometric relationship:

$$K = \mathrm{round}\left(\frac{R}{2} - 1\right), \tag{1-6}$$

where round(.) means rounding to a nearest integer;

the integral image plane is cropped to a same size as the 2D display screen, and the number of voxels on the cropped integral image plane is expressed as:

$$N_h(k) = \mathrm{round}\left(\frac{W}{\Delta x(k)}\right) \tag{1-7}$$

and $$N_v(k) = \mathrm{round}\left(\frac{H}{\Delta x(k)}\right), \tag{1-8}$$

where $N_h(k)$ represents the number of voxels on the cropped integral image plane distributed in a horizontal direction, $N_v(k)$ represents the number of voxels on the cropped integral image plane distributed in a vertical direction, W represents the width of the 2D display screen, and H represents the height of the 2D display screen.

It should be noted that in the above process, only the intersection of pixel rays in two adjacent image elements is taken into account. In fact, the reconstructed rays from non-adjacent image elements will also form intersection points in the 3D image space, as indicated by dashed circles in FIG. 2. According to the integral imaging light field acquisition process, 3D object points corresponding to these points are only recorded by two or more non-continuous lenslets, which is inconsistent with continuous sampling of a 3D object light field by the micro-lens array in actual situations. Therefore, these intersection points should not be deemed as voxels of the 3D image. Moreover, each pixel on a real display has a certain size, light beams from a set of homologous pixel points overlap in space to form a diffuse spot, and the diffuse spots at these positions will be obscured by other diffuse spots on the integral image plane in front of them, such that lack of these voxels will not significantly affect the quality of the reconstructed 3D image.

The formulas (1-1)-(1-8) describe all voxel characteristic parameters of the integral imaging 3D display. It can be seen that the above voxel characteristic parameters are only related to structural parameters of the integral imaging 3D display, such as the lenslet pitch, the number of lenslets, the screen size and the pixel size of the 2D display screen, a spacing between the pixel plane and the micro-lens array plane, etc. In other words, when the structural parameters of the system are determined, all possible voxel positions of the integral imaging 3D display and also a space distribution law will be uniquely determined.

Figure 3:
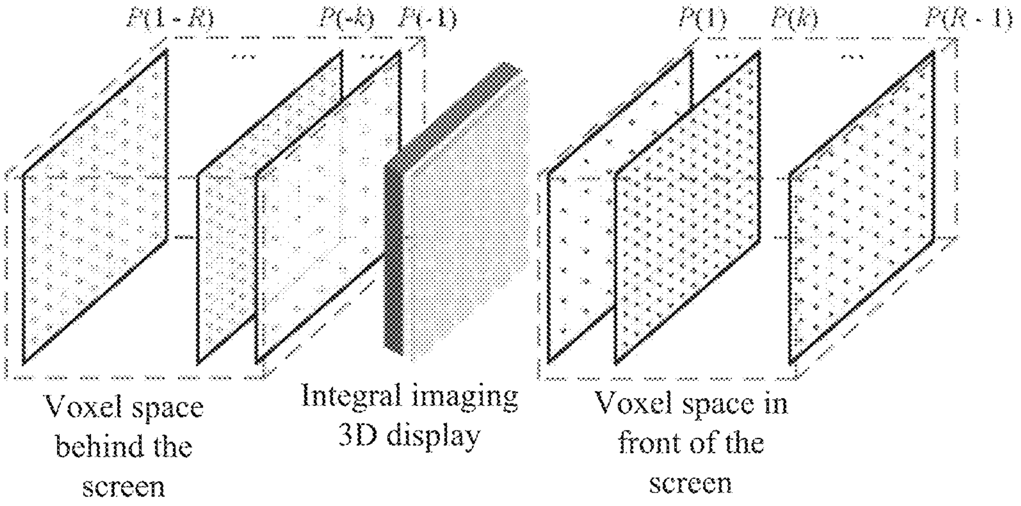
FIG. 3 is a schematic diagram of distribution of a complete 3D voxel space of the present disclosure.

Obviously, reverse extension lines of the reconstructed rays will also form a similar voxel space behind the screen, the same expression applies to its characteristic parameters and also characteristic parameters of a voxel space in front of the screen, and distribution of a complete 3D voxel space is illustrated in FIG. 3.

FIG. 2 illustrates all possible voxel positions of an integral imaging 3D display used for 3D image reconstructing, where P(1) is the first integral image plane, P(k) is the $k^{th}$ integral image plane, $P(N_p)$ is the $N_p^{th}$ integral image plane, z(k) is a distance from the $k^{th}$ integral image plane to the micro-lens array plane, $\Delta x(k)$ is a spacing between adjacent voxels on the integral image plane P(k) in a horizontal direction, and $\Delta\theta$ is the angular interval of adjacent reconstructed rays. However, in actual situations, the voxels on the first K integral image planes indicated by the dashed box in FIG. 2 are fewer and unevenly distributed, so they are not suitable for reconstructing continuous 3D scenes, and these integral image planes can be discarded when optimizing the voxel space.

S2-2, roughly select the integral image planes with a relatively high voxel space resolution according to the position of a central depth plane, specifically including:

assuming that $R_x(k)$ and $R_y(k)$ represent the space resolutions of the voxels on the integral image plane P(k) both in the horizontal and vertical directions respectively, which are expressed as:

$$R_x(k) = \frac{1}{\Delta x(k)} = \frac{R-k}{p} \tag{1-9}$$

and $$R_y(k) = \frac{1}{\Delta y(k)} = \frac{R-k}{p}; \tag{1-10}$$

it can be seen from the formulas (1-9) and (1-10) that the voxel space resolution decreases with an increase of the integral image plane number, that is, the voxel space resolution of the integral image plane closer to the micro-lens array plane is higher, and the voxel space resolution of the integral image plane farther away from the micro-lens array plane gradually decreases.

Figure 4:
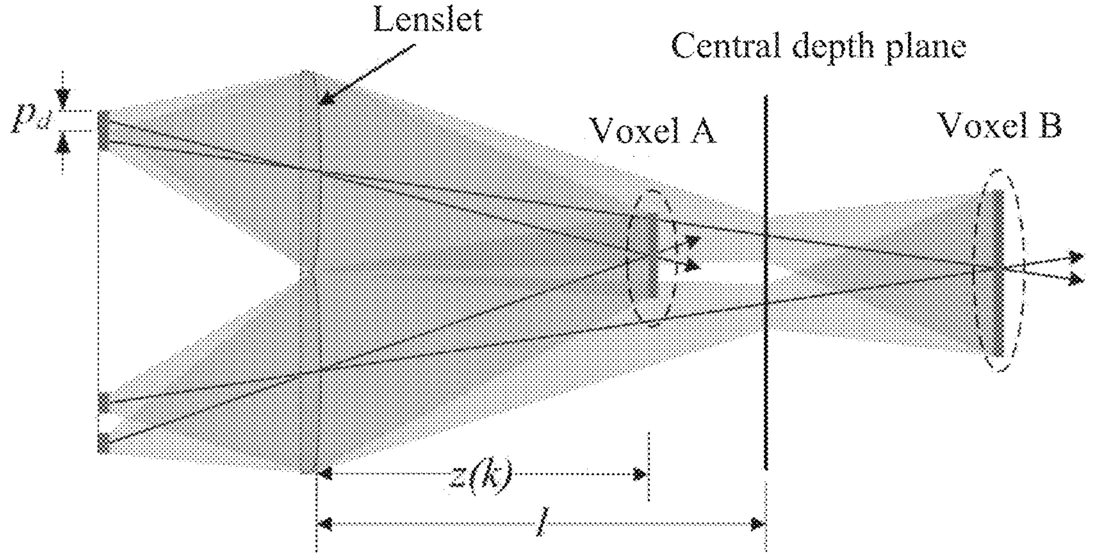
FIG. 4 is a schematic diagram of an actual voxel reconstructing process according to an example of the present disclosure.

It should be noted that the voxel space distribution illustrated in FIG. 2 is based on a voxel reconstructing process under ideal conditions, that is, the pixels on the integral imaging 3D display are simplified to ideal point light sources, and when an impact of lens aberration is not considered, ideal point-like voxels are formed. In actual situations, each pixel on the integral imaging 3D display is a planar light-emitting unit with a certain size, the light beam emitted by each pixel unit is modulated by the lenslet to form a divergent light beam that propagates in the 3D image space, and the light beam converges into a smallest light spot on the central depth plane conjugate with the pixel plane. At other depth positions in front of and behind the central depth plane, the light beam diffuses into a larger diffuse spot, as illustrated in FIG. 4 (in FIG. 4, pa is the size of pixels on a 2D display screen, z(k) is the distance from the $k^{th}$ integral image plane to the micro-lens array plane, and l represents the distance from the central depth plane to the micro-lens array plane). Therefore, the voxels formed by the light beams of the homologous pixel points converged on each integral image plane away from the central depth plane are actually diffuse spots, such as a voxel A and a voxel B illustrated in FIG. 4. When the lens aberration is not taken into account, adjacent voxels at the central depth plane are not overlapped with each other, and the voxels on other integral image planes in front of and behind the central depth plane will partially overlap due to the diffusion of voxels. The voxel size is enlarged during diffusion when the integral image plane is farther from the central depth plane, and accordingly, a ratio of overlap between voxels will become higher, where the overlap will lead to a decline in the voxel space resolution. Therefore, the voxel space resolution of a 3D image is determined by the number of voxels and the size of the voxels, and the voxel space resolution is higher when there are more smaller voxels within a certain spatial range.

It can be seen from the formulas (1-5), (1-7) and (1-8) that when the parameters of the 2D display screen (including a screen width W of the 2D display screen, a screen height H of the 2D display screen, and a pixel size pa of the 2D display screen) and the parameters of the lenslet (a pitch p of the lenslet) are determined, the number of voxels on each integral image plane is determined, and a size of the voxels on each integral image plane is related to the position of the central depth plane;

the position of the central depth plane is determined by a Gaussian imaging formula:

$$l = \frac{gf}{g-f}, \tag{1-11}$$

where l represents the distance from the central depth plane to the micro-lens array plane, and f is the focal length of the lenslet;

therefore, by adjusting a spacing g between the micro-lens array plane and the pixel plane, the central depth plane is arranged near the integral image plane where voxels are denser, and then the integral image plane with a relatively high voxel space resolution is roughly selected according to the position of the central depth plane;

S2-3, on the basis of the S2-2, select a part of the voxel space that meets the performance requirements as the optimal voxel space, according to 3D DOF (Depth of Field) requirements of the integral imaging 3D display and a degree of overlap between adjacent voxels, specifically comprising:

according to the geometric relationship, a size $S_v$ of the voxels on the integral image plane at a distance z from the micro-lens array plane is expressed as:

$$S_v = \frac{|z|}{gR}p + \frac{|z-l|}{l}p; \tag{1-12}$$

Figure 5:
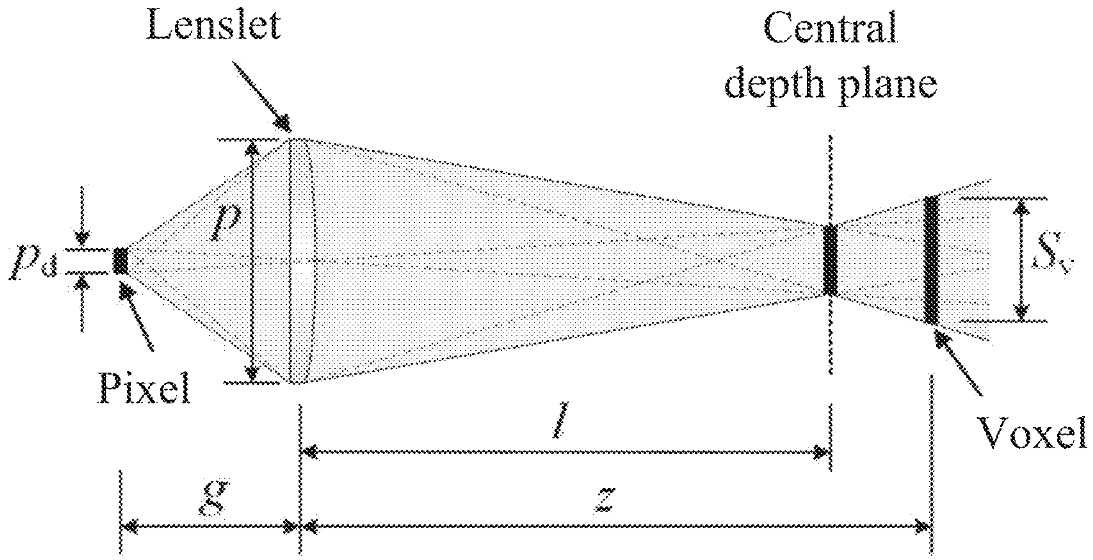
FIG. 5 is a schematic diagram of voxel size calculation according to an example of the present disclosure.

FIG. 5 is a schematic diagram of voxel size calculation, where $p_d$ is the size of pixels on a 2D display screen, p represents the pitch of a lenslet, $S_v$ is the size of the voxels, l represents the distance from the central depth plane to the micro-lens array plane, and z is the distance from the integral image plane to the micro-lens array plane.

When adjacent voxels are overlapped with each other, their overlap degree $\beta$ is expressed as:

$$\beta = 1 - \left(\frac{D_V}{S_V}\right), \tag{1-13}$$

where $D_v$ represents a spacing between the adjacent voxels, which is determined by $\Delta x(k)$ and $\Delta y(k)$ in the formula (1-5); given an overlap threshold $\beta_0$, depth positions of integral image planes at front and rear edges of the integral imaging 3D display within a 3D DOF range can be determined; an edge integral image plane closest to a viewer is referred to as a front edge integral image plane, and an edge integral image plane farthest from the viewer is referred to as a rear edge integral image plane; assuming that distances between the front edge integral image plane and the rear edge integral image plane and the micro-lens array plane are $z_1$ and $z_2$, respectively, the 3D DOF of the integral imaging 3D display is expressed as:

$$\Delta z = |z_1 - z_2|; \tag{1-14}$$

Figure 6:
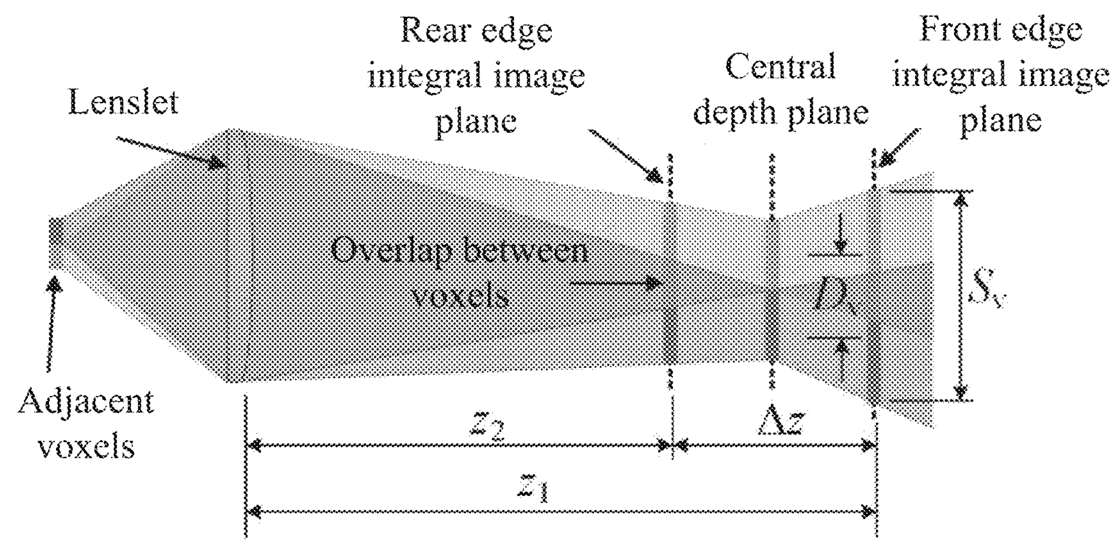
FIG. 6 is a schematic diagram of 3D DOF (Depth of Field) calculation according to an example of the present disclosure.

FIG. 6 is a schematic diagram of 3D DOF (Depth of Field) calculation, where $D_v$ is the spacing between the adjacent voxels, $S_v$ is the size of the voxels, $z_1$ is the distance between the front edge integral image plane and the micro-lens array plane, $z_2$ is the distance between the rear edge integral image plane and the micro-lens array plane, and $\Delta z$ is the 3D DOF.

It is worth noting that although in this example, an idea of a Rayleigh criterion is employed when determining an edge plane where adjacent voxels are just distinguishable, but in practical applications, the criterion for selection of the voxel overlap threshold $\beta_0$ is far less strict than the Rayleigh criterion. This is because the Rayleigh criterion is a relatively strict objective determination condition, and is usually used to measure the resolution limit of an optical system, and a human visual system far outperforms a general optical system in tolerance to image blur. Further, the voxel overlap threshold $\beta_0$ can be calculated based on an actual value of the resolution limit human eyes can distinguish, or can be measured experimentally according to the human eye's subjective perception of image clarity.

Therefore, based on the S2-2, the front edge integral image plane and the rear edge integral image plane are selected according to 3D DOF requirements of the integral imaging 3D display and the overlap degree between adjacent voxels, such that a 3D image reconstructed between the front edge integral image plane and the rear edge integral image plane always maintains high clarity.

S3, synthesize an elemental image array: input the acquired depth data and texture data of the 3D scene, and synthesize the elemental image array that meets the display performance requirements of the integral imaging 3D display according to the selected optimal voxel space.

In this example, the synthesizing of an elemental image array includes the following sub-steps:

S3-1, transform the acquired depth data of the 3D scene into a depth range corresponding to the optimal voxel space, and segment the acquired depth data of the 3D scene into a plurality of integral image planes corresponding to the optimal voxel space;

S3-2, segment the acquired texture data of the 3D scene and paste them on each integral image plane, and adjust the space resolution of the texture data of the 3D scene on each integral image plane to the voxel space resolution of a corresponding integral image plane through upsampling or downsampling, i.e., generate a texture slice image on the corresponding integral image plane;

S3-3, according to mapping relations between the voxels and the homologous pixel points, map the texture slice image on each integral image plane to an elemental image array plane point by point, to generate a sub-elemental-image-array corresponding to each integral image plane; and S3-4, extend the sub-elemental-image-array corresponding to each integral image plane in a hole direction according to a relationship between parallax (in pixels) and depth (to avoid image quality degradation caused by the holes), and fuse the extended sub-elemental-image-array to generate a complete elemental image array.

The mapping relationship between the voxels and the homologous pixel points is expressed as:

$$F: Vx \rightarrow HomoPx, \tag{1-15}$$

where Vx represents a voxel set, HomoPx represents a pixel set, and F represents a mapping function. (For any element in the voxel set Vx, the number of corresponding elements in the pixel set HomoPx represents the number of reconstructed rays that constitute the voxel. Therefore, an area of interest in the 3D scene can be reconstructed on a voxel with more reconstructed rays to obtain denser viewpoints and a smoother motion parallax.)

Figure 7:
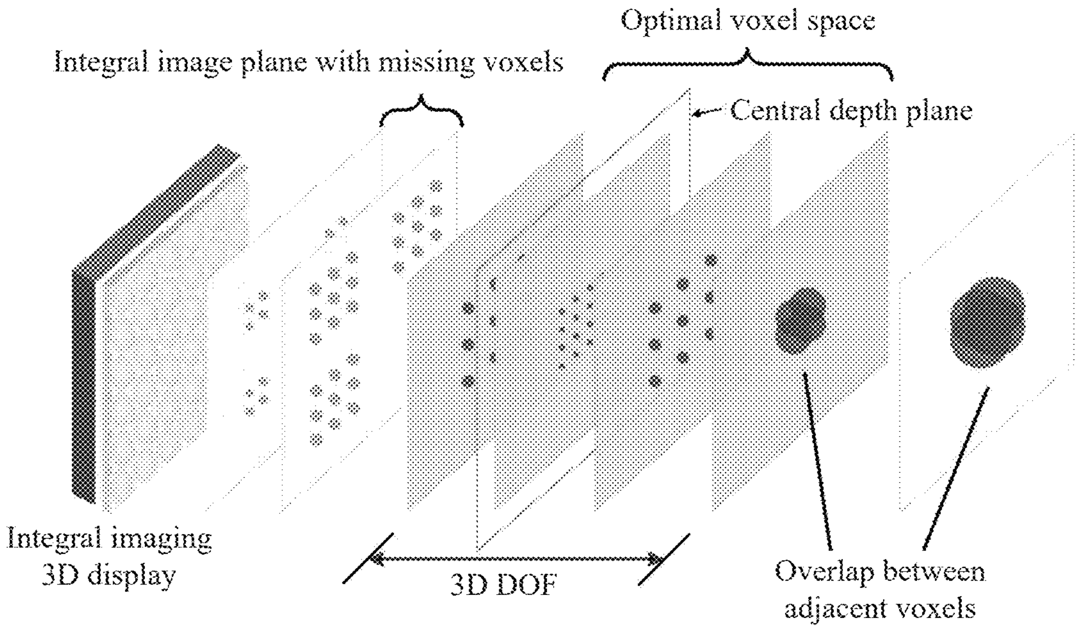
FIG. 7 is a schematic diagram of a preferred solution for voxel space clipping based on display performance according to an example of the present disclosure.

Limited by the pixel resolution of the 2D display screen, a total amount of information that can be displayed by the integral imaging 3D display is still very limited, such that performance indicators such as the space resolution, the 3D DOF and parallax smoothness of the 3D image mutually restrict. Therefore, in practical applications, it is necessary to comprehensively consider the above performance indicators to select the optimal voxel space for reconstructing 3D images. FIG. 7 illustrates a preferred solution for voxel space clipping based on display performance, where each integral image plane is cropped to a same size as the 2D display screen, some integral image planes with uneven voxel distribution are discarded, and a middle part (a darker part in a middle of FIG. 7) represents the voxel space after optimization according to display performance, that is, the optimal voxel space.

Figure 8:
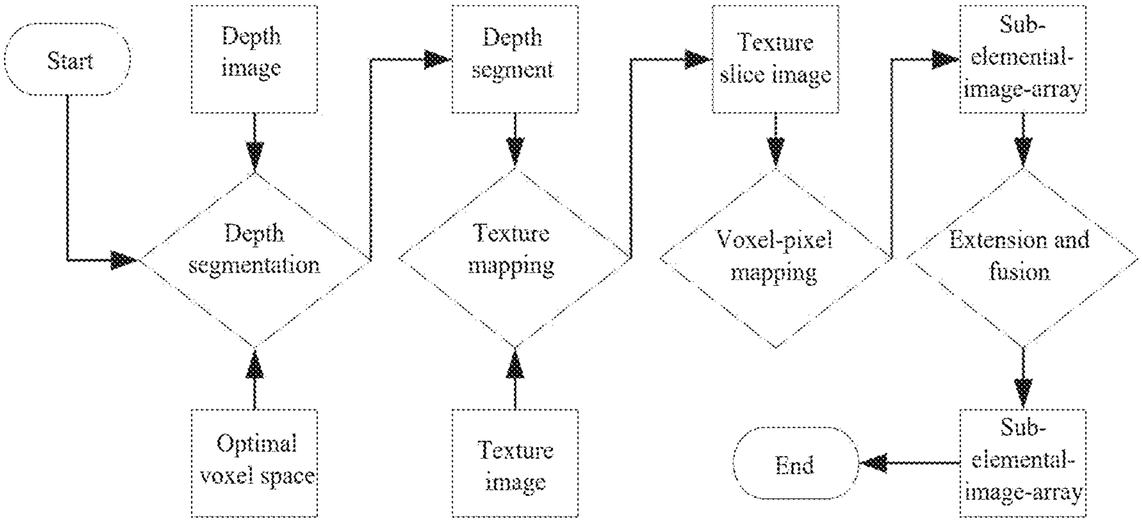
FIG. 8 is a flowchart of a method for integral imaging elemental image array generation based on optimal voxel space distribution according to an example of the present disclosure.

In this example, FIG. 8 illustrates a flowchart of a method for integral imaging elemental image array generation based on optimal voxel space distribution.

In order to verify the effectiveness of the method for integral imaging elemental image array generation based on optimal voxel space distribution, a corresponding 3D acquisition device and a 3D display device are now set up.

The 3D acquisition device includes a depth camera and a computer. The depth camera used in this example is Intel RealSense D435 (model), which is a consumer-grade depth camera launched by Intel, has the advantages of powerful functions, compactness and lightness and the like, and is widely applied to machine navigation, object recognition, human-computer interaction and other fields.

The depth camera mainly includes two infrared cameras, an RGB camera and an infrared dot matrix projector. The RealSense D435 uses a binocular vision solution for depth measurement. The images captured by the left and right infrared cameras are sent to a built-in depth processing module to calculate a depth value of each pixel based on the principle of triangulation. The infrared dot matrix projector projects an infrared dot matrix pattern onto a target scene to improve a depth calculation accuracy in scenes with fewer feature points (such as white walls and the like). The RGB camera is used to acquire real-time texture images of the target scene. A certain distance between the infrared camera and the RGB camera results in inconsistency in fields of view of the texture image and the depth image, such that an origin alignment operation is usually required to ensure both the fields of view remain consistent. The RealSense D435 supports dynamic depth measurement and is capable of outputting an RGB video stream with a maximum resolution of 1920×1080 and a depth video stream with a maximum resolution of 1280×720. The depth video stream is similar to the RGB video stream, and the difference therebetween lies in a value of each pixel point is not an RGB grayscale value, but a depth distance between the camera and a target measured. The RealSense D435 supports depth measurement within a range of 0.2 m to 10 m and can be used for real-time acquisition of RGB-D images in various indoor and outdoor scenes.

Hardware configuration and parameter specifications of the 3D acquisition device are illustrated in Table 1.

TABLE 1

The hardware configuration and parameter specifications of the 3D acquisition device set up in this example

| Component | Parameter | Specification |
|---|---|---|
| Depth camera | Model | Intel ® RealSense ™D435 |
| | Depth image resolution | Up to 1280 × 720 |
| | Ideal depth range | 0.3 m to 3 m |
| | Depth measurement accuracy | <2% at 2 m |
| | Depth field of view | 87° × 58° |
| Computer | Processor | Intel(R) Core(TM)i5-10210U CPU@1.60 GHz |
| | Operating system | Windows 10 |

Figure 9:
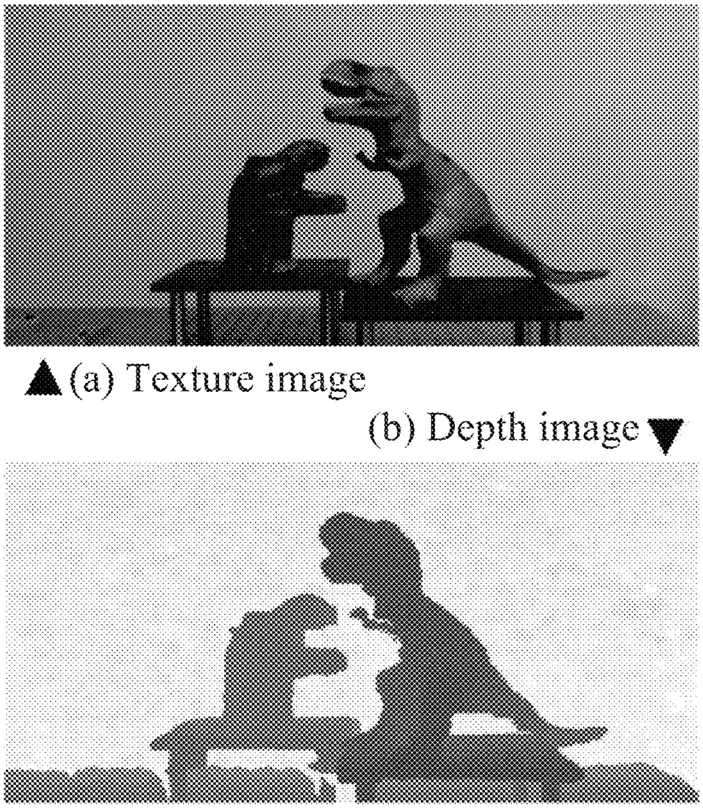
FIG. 9 is an RGB D image pair acquired by a depth camera according to an example of the present disclosure.

In an experiment, the depth camera is connected to a computer via a USB data cable, corresponding codes are written by using a development toolkit and OpenCV library functions provided by RealSense, real-time RGB video streams and depth video streams are read from the depth camera, and data frames at a same moment are captured. In order to prevent an error of mismatch due to asynchronism between the RGB video stream and the depth video stream, RGB frames and depth frames usually need to be aligned. A directly acquired depth image usually contains black holes caused by computational errors, and the black holes can be repaired by calling a corresponding hole-filling function. The repaired depth data frame is normalized until its depth value corresponds to a grayscale value range of 0 to 255. Finally, the depth data frames and corresponding RGB frames are saved in an image format to obtain a pair of RGB-D images. FIG. 9 shows a pair of RGB-D images captured by the depth camera in this example, and resolutions of both the images are 1280×720. Two dinosaur toys placed at dislocated positions from front to back represent a 3D target captured, texture illustrated in FIG. 9(*a*) represents surface texture of the 3D target, and depths illustrated in FIG. 9(*b*) represent distances between each target point and the depth camera, where a lower grayscale value indicates a closer distance between a target point and the camera.

Figure 10:
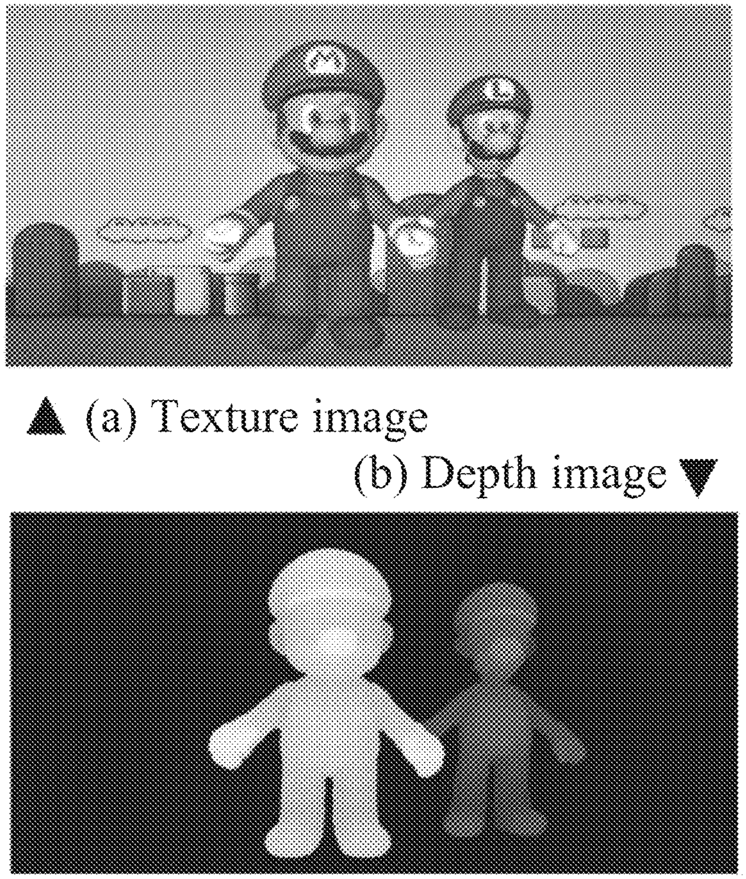
FIG. 10 is an RGB D image pair of a virtual 3D scene created by 3DS MAX software according to an example of the present disclosure.

In order to verify applicability of the method for the present disclosure to different depth data acquisition methods, a virtual 3D scene is created by using the 3DS MAX software in this example. Two cartoon characters "Mario" and "Luigi" represent 3D targets captured. A pair of RGB-D images with a resolution of 3840×2160 are rendered by a virtual camera of 3DS MAX, as illustrated in FIG. 10. Texture illustrated in FIG. 10(*a*) represents surface texture of the 3D target, and depths illustrated in FIG. 10(*b*) represent distances between each target point and the depth camera, where a higher grayscale value indicates a closer distance between a target point and the camera.

The 3D display device includes an integral imaging 3D display and a high-definition digital camera. The 3D display is formed by precisely coupling a LCD smartphone with a resolution of 3840×2160 and a micro-lens array; and the high-definition digital camera is used to record 3D images from different viewing angles. Hardware configuration and detailed parameters of the 3D display device are illustrated in Table 2.

TABLE 2

The hardware configuration and detailed parameters of the integral imaging 3D display device set up in this example

| Component | Parameter | Specification |
|---|---|---|
| 2D display screen | Model | Sony xperia Z5 premium |
| | Screen size | 121.2 × 68.2 mm |
| | Screen resolution | 3840 × 2160 pixels |
| | Pixel pitch | 31.5 μm |
| | Image element resolution | 30 × 30 pixels |
| Micro-lens array | Lenslet pitch | 1 mm |
| | Focal length | 3.3 mm |
| | Number of lenslets | 128 × 72 |
| | Spacing between the 2D display screen and the micro-lens array | 4.0 mm in a real mode, and 2.0 mm in a virtual mode |

Figure 11:
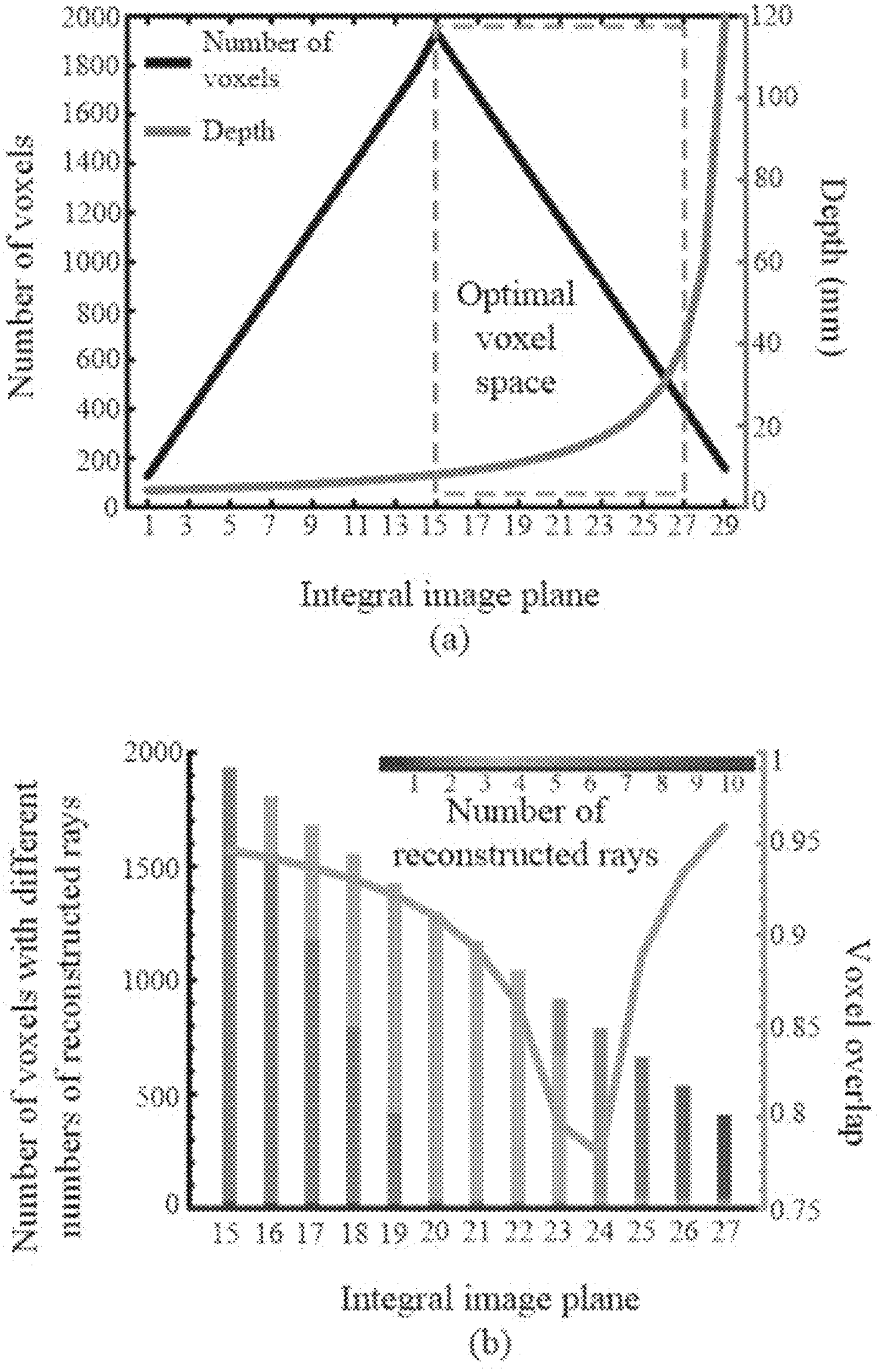
FIG. 11 is a diagram illustrating voxel space distribution and optimal results in a real mode according to an example of the present disclosure.

When a spacing g between the micro-lens array and the 2D display screen is 4 mm, and g>f, the integral imaging 3D display works in the real mode, and the depth value and the number of voxels of each integral image plane are calculated according to a voxel space characteristic formula, as illustrated in FIG. 11(*a*). The 3D display has a total of 29 integral image planes, among which the integral image planes P(1)-P(14) have missing voxels and should be discarded. However, there are too few voxels on the integral image planes P(28) and P(29), and their corresponding depth values double compared to that of the previous integral image plane, resulting in that the voxels located here diffuse sharply, which will seriously reduce a ratio of contrast of the reconstructed 3D image. Therefore, these two integral image planes also need to be discarded.

According to the formula (1-11), the depth value of the central depth plane is calculated to be about 18.85 mm, that is, the central depth plane is located between the integral image planes P(23) and P(24). After discarding the above integral image planes, the integral image planes P(15)-P(27) with the depth values ranging between 8 mm and 30 mm, are roughly symmetrically distributed on both sides of the central depth plane, which can be regarded as a primary preferred voxel space in consideration of the depth value and the number of voxels, as illustrated in the dashed box in FIG. 11(*a*).

On the basis of the above preferred voxel space, a secondary optimization is performed in consideration of the impact of factors such as voxel overlap and the number of reconstructed rays. The voxel space distribution in this case is illustrated in FIG. 11(*b*), where a stacked bar graph shows the voxel distribution on each integral image plane, and each staked bar represents the number of voxels with a specific number of reconstructed rays, where the staked bars are distinguished by different grayscales. Taking the integral image plane P(20) as an example, there are 1280 voxels at this depth, each of 1260 voxels contains 3 reconstructed rays, and each of remaining 20 voxels contains only 2 reconstructed rays each. As the number of the integral image planes increases, the voxels with more reconstructed rays increases significantly, resulting in a smoother motion parallax of the reconstructed 3D images.

A curve in FIG. 11(*b*) represents the overlap degrees of adjacent voxels on each integral image plane. It can be seen that the overlap degree of voxels on the integral image plane P(24) closest to the central depth plane is the lowest, while the overlap degrees of voxels on two edge integral image planes P(15) and P(27) are roughly equal and fall within a range that human eyes can distinguish. Therefore, the voxels on these integral image planes can be retained. In this example, a preferred voxel space consisting of the integral image planes P(15)-P(27) is finally selected, which is the optimal voxel space.

Figure 12:
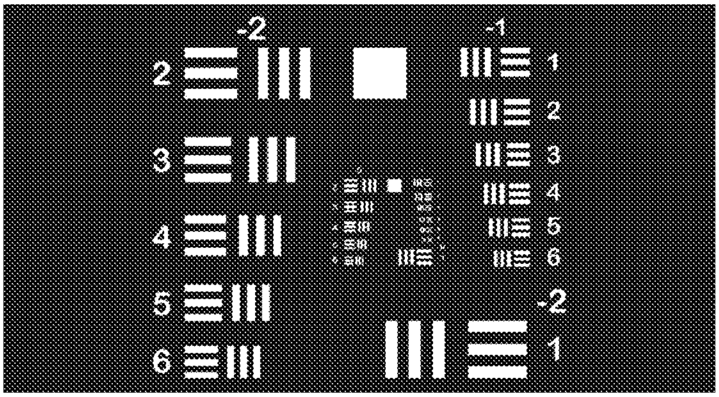
FIG. 12 is a USAF 1951 resolution test target according to an example of the present disclosure.

In order to verify the space resolution of the 3D image reconstructed on each integral image plane, a USAF1951 resolution test chart is used for testing in this example. The USAF 1951 test chart is usually used to test resolving power of an optical system, and a test pattern consists of a plurality of groups of horizontally and vertically arranged black-and-white line pairs, as illustrated in FIG. 12, where the vertical line pairs are used to test a horizontal resolution, and the horizontal line pairs are used to test a vertical resolution. The USAF 1951 test chart measures the resolution of the optical system according to the number of line pairs resolvable per millimeter, with the unit being lp/mm. Test units for different resolutions are marked based on group numbers and element numbers, each element has a specific line length and line width, and a size of each element gradually decreases from its periphery to its center. A resolution where a smallest element is resolvable on the resolution test chart is a resolution limit of the optical system tested. The resolution corresponding to each element can be calculated through the following formula:

$$\text{Resolution} = 2^{Group\ member + \frac{Element\ member - 1}{6}} \tag{1-16}$$

Figure 13:
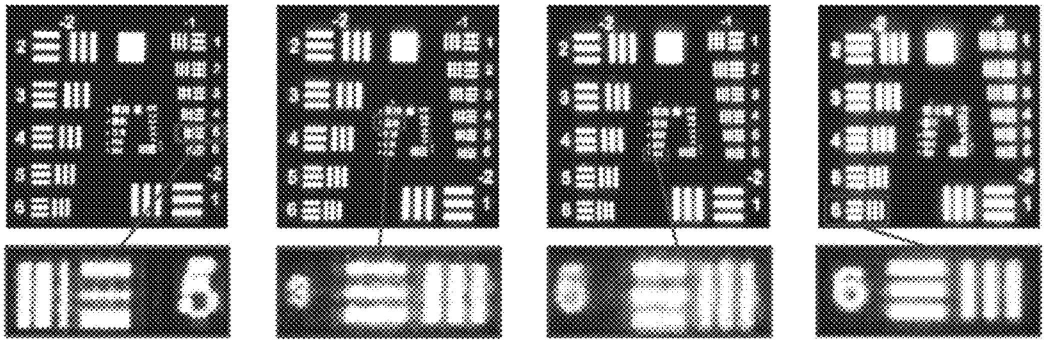
FIG. 13 is a resolution test target image reconstructed on each integral image plane according to an example of the present disclosure.

In the experiment, according to the USAF 1951 resolution test target images and depth values of each integral image plane, the sub-elemental-image-arrays corresponding to the integral image planes P(15)-P(27) are firstly generated in sequence through the elemental image array generation method provided in this example, and then are displayed on the integral imaging 3D display one by one, and the resolution target images reconstructed on each integral image plane are recorded by a camera, as illustrated in FIG. 13. For the convenience of discussion, only the images reconstructed on some integral image planes are displayed here, where FIG. 13(*a*) illustrates a resolution target image reconstructed on the integral image plane P(16), FIG. 13(*b*) illustrates a resolution target image reconstructed on the integral image plane P(21), FIG. 13(*c*) illustrates a resolution target image reconstructed on the integral image plane P(24), and FIG. 13(*d*) illustrates a resolution target image reconstructed on the integral image plane P(27).

Figure 14:
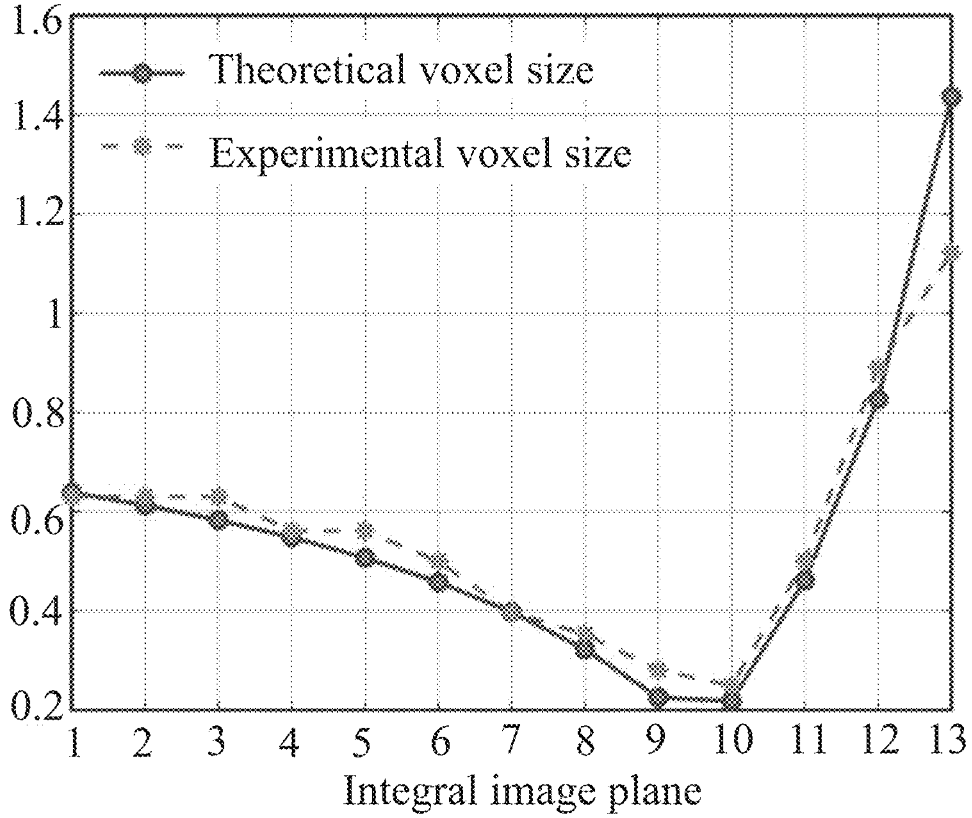
FIG. 14 is a diagram of comparison between an actual value and a theoretical value of voxel according to an example of the present disclosure.

A line width corresponding to the smallest resolvable element in a reconstructed image represents an actual voxel size of the image. The actual voxel size is compared with a theoretical voxel size calculated by the formula (1-12), as illustrated in FIG. 14. It can be seen that a large human eye tolerance error occurs due to excessive diffusion of the voxels on the integral image plane P(13) with the largest depth value, and measured sizes of the voxels on other integral image planes are perfectly consistent with theoretical sizes thereof. The experiment demonstrates that a voxel space distribution model provided in this example is applicable.

Figure 15:
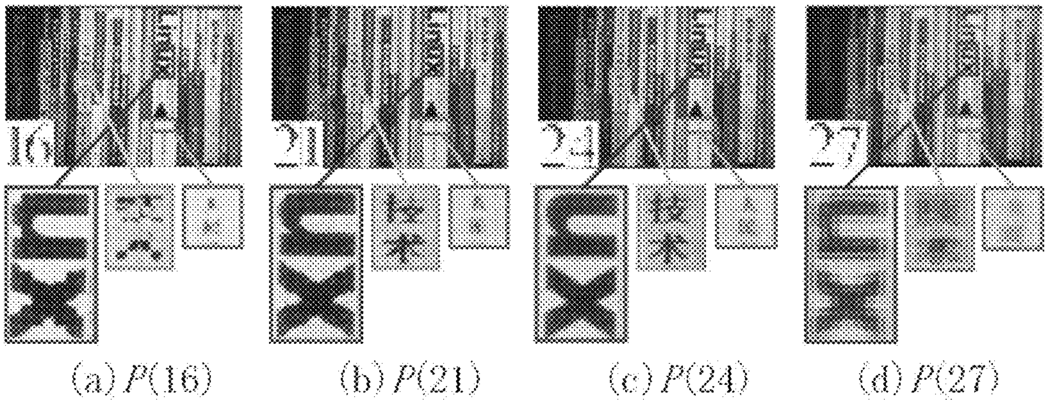
FIG. 15 is a comparison diagram of quality of high-frequency and low-frequency images reconstructed on different integral image planes according to an example of the present disclosure.

In order to verify the differences in quality of high-frequency and low-frequency images reconstructed by the integral imaging 3D display, the USAF 1951 resolution test target image is replaced with a real image containing more high-frequency and low-frequency image information, and the above experiment is repeated to compare the quality of high-frequency and low-frequency images reconstructed on different integral image planes, as illustrated in FIG. 15. FIG. 15 (*a*) is a comparison diagram of quality of high-frequency and low-frequency images reconstructed on the integral image plane P(16), FIG. 15(*b*) is a comparison diagram of quality of high-frequency and low-frequency images reconstructed on the integral image plane P(21), FIG. 15(*c*) is a comparison diagram of quality of high-frequency and low-frequency images reconstructed on the integral image plane P(24), and FIG. 15(*d*) is a comparison diagram of quality of high-frequency and low-frequency images reconstructed on the integral image plane P(27). It can be seen from the reconstructed images illustrated in FIG. 15 that on the integral image planes (such as P(21) and P(24)) closer to the central depth plane, more high-frequency image information can be distinguished, such as Chinese characters "技术" (technology) and "人民" (people) in the images. On the integral image planes (such as P(16) and P(27)) farther from central depth plane, the reconstructed images gradually become blurred, and only little low-frequency image information (such as English characters "UX" in FIG. 15) can be clearly distinguished. The experiment demonstrates that for the integral imaging 3D display with specific structural parameters, requirements for 3D reconstruction capability of a display system for high-frequency images are more stringent than those for low-frequency images. In practical applications, the quality of reconstructing images of different frequencies by each integral imaging 3D display can be qualitatively or quantitatively tested through experimental methods, such that in a process of generating the elemental image array, a most appropriate voxel space can be flexibly selected according to richness of high-frequency information in a 3D image to be reconstructed, so as to optimize the quality of the reconstructed 3D image.

Figure 16:
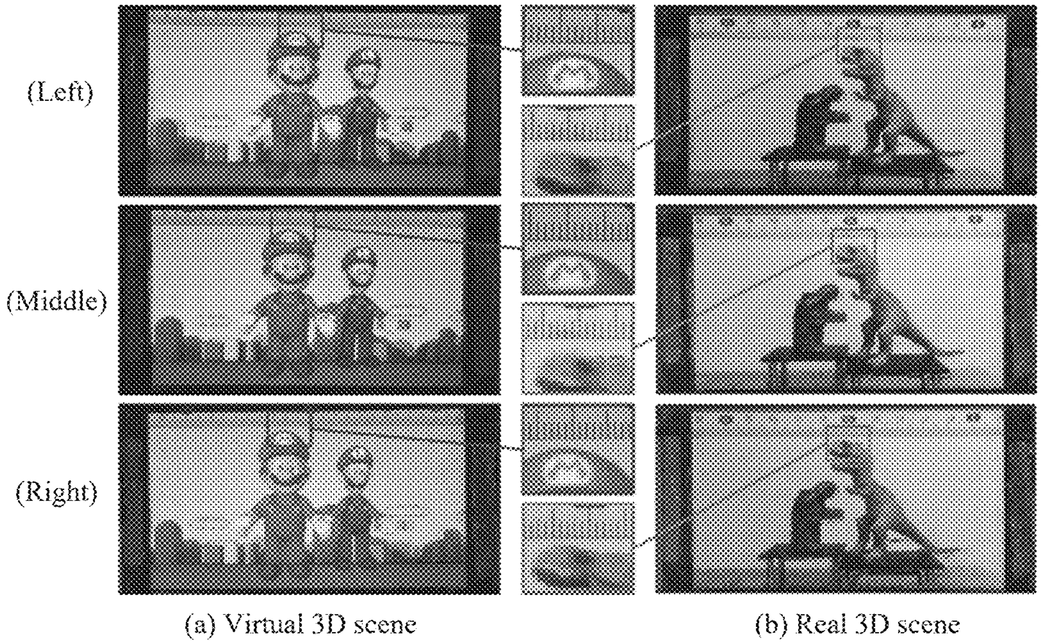
FIG. 16 is an effect diagram of a reconstructed 3D image in a real mode according to an example of the present disclosure.

The above experiments verify the voxel characteristics of each integral image plane. Next, an effect of reconstructing complete 3D images by the integral imaging 3D display is verified in two sets of 3D scenes illustrated in FIGS. 9 and 10. First, in an optimal voxel space consisting of the integral image planes P(15)-P(27), elemental image arrays are generated and displayed in virtual and real 3D scenes respectively. The reconstructed images of different viewing angles are recorded by a camera from left, middle and right directions, as illustrated in FIG. 16. In order to clearly show the motion parallax between images of different viewing angles, a transparent thin ruler is placed on a surface of the micro-lens array. A partially enlarged view of FIG. 16 shows that when a viewpoint moves from left to right, feature points in the 3D image, such as an "M" logo on a hat of the cartoon character "Mario" in a virtual scene, and eyes of a green dinosaur in a real scene, will move to the left accordingly. This indicates that the reconstructed 3D image has a stereoscopic depth protruding from the screen and a continuous motion parallax. Moreover, the images of various viewing angles can be clearly distinguished, almost without obvious cracks. Experimental results show that high-performance 3D image reconstruction can be achieved based on the elemental image array with optimal voxel space distribution generated by the method provided in this example.

Figure 17:
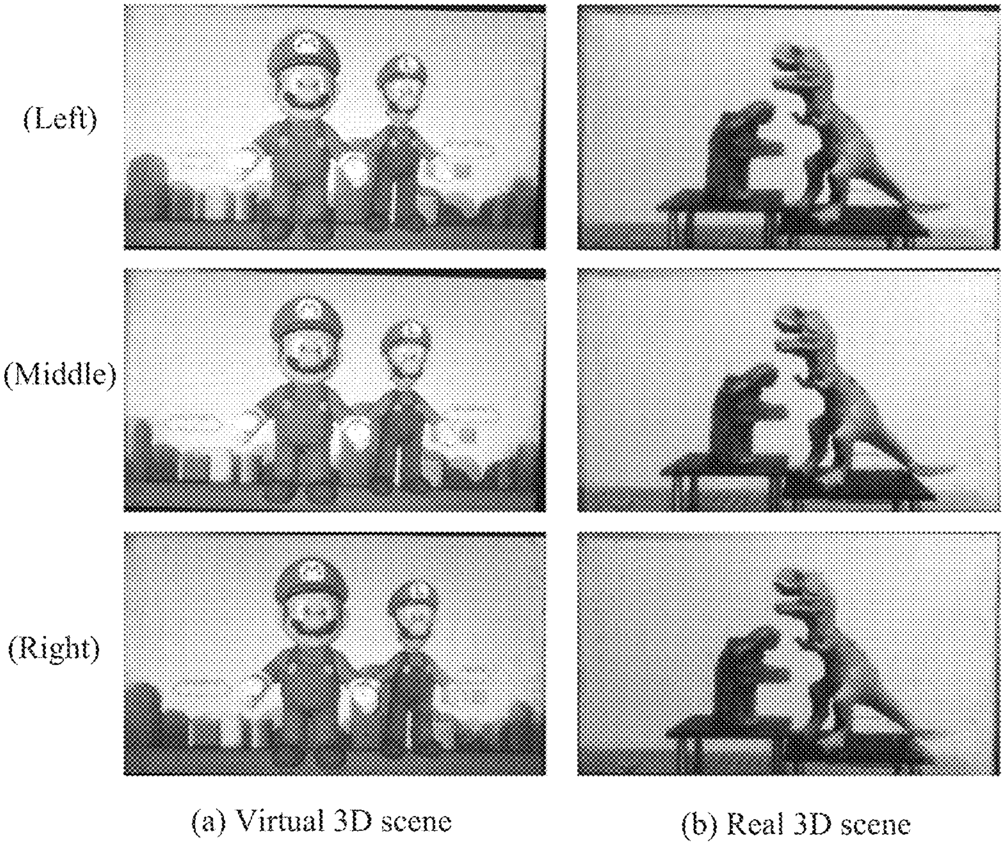
FIG. 17 is an effect diagram of a reconstructed 3D image in a virtual mode according to an example of the present disclosure.

All the above experiments are conducted on an integral imaging 3D display in the real mode. When the spacing g between the micro-lens array and the pixel plane is 2 mm, and $g<f$, the integral imaging 3D display works in the virtual mode, and its central depth plane is located 5.08 mm behind the micro-lens array. Similarly, according to the above experimental process, the integral image planes P(−1)-P(−12) are selected to constitute the optimal voxel space, and the elemental image arrays are generated and displayed in the virtual mode. Similarly, the reconstructed 3D images are recorded by a camera from three different viewing angles (left, middle and right), with results illustrated in FIG. 17. It can be seen that images in both the 3D scenes can be clearly reconstructed. Experimental results indicate that the method provided in this example is also applicable to integral imaging 3D displays working in the virtual mode.

What is claimed is:

1. A method for integral imaging elemental image array generation based on optimal voxel space distribution, comprising the following steps:

(S1), acquiring depth data and texture data of a 3D scene;

(S2), selecting the optimal voxel space: according to a relationship between a voxel space of an integral imaging 3D display and 3D display performance, selecting a part of the voxel space that meets 3D display performance requirements from the entire voxel space of the integral imaging 3D display as the optimal voxel space; and (S3), synthesizing the elemental image array: inputting the acquired depth data and texture data of the 3D scene, and synthesizing the elemental image array that meets the display performance requirements of the integral imaging 3D display according to the selected optimal voxel space, the selecting the optimal voxel space comprises the following sub-steps:

(S2-1), discarding integral image planes with missing voxels from the entire voxel space of the integral imaging 3D display;

(S2-2), roughly selecting the integral image planes with a relatively high voxel space resolution according to a position of a central depth plane; and (S2-3), on the basis of the (S2-2), selecting a part of the voxel space that meets the performance requirements as the optimal voxel space, according to 3D DOF (Depth of Field) requirements of the integral imaging 3D display and a degree of overlap between adjacent voxels, the synthesizing of the elemental image array comprises the following sub-steps:

(S3-1), transforming the acquired depth data of the 3D scene into a depth range corresponding to the optimal voxel space, and segmenting the acquired depth data of the 3D scene into a plurality of integral image planes corresponding to the optimal voxel space;

(S3-2), segmenting the acquired texture data of the 3D scene and pasting them on each integral image plane, and adjusting a space resolution of the texture data of the 3D scene on each integral image plane to the voxel space resolution of a corresponding integral image plane through upsampling or downsampling, i.e., generating a texture slice image on the corresponding integral image plane;

(S3-3), according to mapping relations between the voxels and homologous pixel points, mapping the texture slice image on each integral image plane to an elemental image array plane point by point, to generate a sub-elemental-image-array corresponding to each integral image plane; and (S3-4), extending the sub-elemental-image-array corresponding to each integral image plane in a hole direction according to a relationship between parallax and depth, and fusing an extended sub-elemental-image-array to generate a complete elemental image array.

2. The method for integral imaging elemental image array generation based on optimal voxel space distribution according to claim 1, wherein the selecting an optimal voxel space comprises the following sub-steps:

(S2-1), the discarding of the integral image planes with missing voxels from the entire voxel space of the integral imaging 3D display, specifically comprising:

establishing a world coordinate system with a geometric center of a micro-lens array plane as an origin, where an X-Y plane coincides with the micro-lens array plane, and a Z axis is perpendicular to the micro-lens array plane; assuming that each image element contains R×R pixels, each image element will emit R×R reconstructed rays, and the reconstructed rays propagate in a 3D image space at a same angular interval, wherein the angular interval of adjacent reconstructed rays is expressed as:

$$\Delta\theta = \arctan\left(\frac{p_d}{g}\right), \tag{1-1}$$

wherein g is the distance between a pixel plane and the micro-lens array plane, and $p_d$ is the size of pixels on a 2D display screen;

the reconstructed rays emitted by a pixel in any image element intersect with each reconstructed ray from its adjacent image element, which forms at most $(R-1)^2$ voxels, and the voxels are distributed at R−1 different depth positions, so a total number of integral image planes carrying all voxels is expressed as:

$$N_p = R-1; \tag{1-2}$$

assuming that a $k^{th}$ ($1 \le k \le N_p$) integral image plane is P(k), its distance z(k) from the micro-lens array plane is expressed as:

$$z(k) = \frac{pg}{p - kp_d} = \frac{gR}{R-k}, \tag{1-3}$$

wherein p represents the pitch of a lenslet;

a spacing Δz(k) between adjacent integral image planes is expressed is:

$$\Delta z(k) = z(k+1) - z(k); \tag{1-4}$$

assuming that Δx(k) and Δy(k) represent spacings between adjacent voxels on the integral image plane P(k) in horizontal and vertical directions respectively, then:

$$\Delta x(k) = \Delta y(k) = \frac{z(k)p_d}{g} = \frac{p}{R-k}; \tag{1-5}$$

a set of voxels formed by the intersection of the reconstructed rays from two adjacent image elements are distributed in a rectangular pyramid shape, some areas are unevenly distributed due to lack of some voxels, and the number of integral image planes wherein voxels are not distributed uniformly is calculated according to a geometric relationship:

$$K = \text{round}\left(\frac{R}{2} - 1\right), \tag{1-6}$$

wherein round (·) means rounding to a nearest integer;

the integral image plane is cropped to a same size as the 2D display screen, and the number of voxels on a cropped integral image plane is expressed as:

$$N_h(k) = \text{round}\left(\frac{W}{\Delta x(k)}\right) \tag{1-7}$$

and $$N_v(k) = \text{round}\left(\frac{H}{\Delta y(k)}\right), \tag{1-8}$$

wherein $N_h(k)$ represents the number of voxels on the cropped integral image plane distributed in a horizontal direction, $N_v(k)$ represents the number of voxels on the cropped integral image plane distributed in a vertical direction, W represents a width of the 2D display screen, and H represents a height of the 2D display screen;

the formulas (1-1)-(1-8) describe all voxel characteristic parameters of the integral imaging 3D display; obviously, reverse extension lines of the reconstructed rays will also form a similar voxel space behind the screen, and a same expression applies to its characteristic parameters and also characteristic parameters of the voxel space in front of the screen; and (S2-2), the roughly selecting of the integral image planes with the relatively high voxel space resolution according to a position of the central depth plane, specifically comprising:

assuming that $R_x(k)$ and $R_y(k)$ represent the space resolutions of the voxels on the integral image plane P(k) both in the horizontal and vertical directions respectively, which are expressed as:

$$R_x(k) = \frac{1}{\Delta x(k)} = \frac{R-k}{p} \text{ and} \tag{1-9}$$

$$R_y(k) = \frac{1}{\Delta y(k)} = \frac{R-k}{p}; \tag{1-10}$$

it can be seen from the formulas (1-9) and (1-10) that the voxel space resolution decreases with an increase of the integral image plane number, that is, the voxel space resolution of the integral image plane closer to the micro-lens array plane is higher, and the voxel space resolution of the integral image plane farther away from the micro-lens array plane gradually decreases;

it can be seen from the formulas (1-5), (1-7) and (1-8) that when the parameters of the 2D display screen and the parameters of the lenslet are determined, the number of voxels on each integral image plane is determined, and the size of the voxels on each integral image plane is related to the position of the central depth plane;

the position of the central depth plane is determined by the Gaussian imaging formula:

$$l = \frac{gf}{g-f}, \tag{1-11}$$

wherein l represents the distance from the central depth plane to the micro-lens array plane, and $f$ the focal length of the lenslet;

therefore, by adjusting a distance g between the micro-lens array plane and the pixel plane, the central depth plane is arranged near the integral image plane wherein voxels are denser, and then the integral image plane with the relatively high voxel space resolution is roughly selected according to the position of the central depth plane;

(S2-3), on the basis of the (S2-2), selecting a part of the voxel space that meets the performance requirements as the optimal voxel space, according to 3D DOF (Depth of Field) requirements of the integral imaging 3D display and a degree of overlap between adjacent voxels, specifically comprising:

according to the geometric relationship, a size $S_v$ of the voxels on the integral image plane at a distance z from the micro-lens array plane is expressed as:

$$S_v = \frac{|z|}{gR}p + \frac{|z-l|}{l}p; \tag{1-12}$$

when adjacent voxels are overlapped with each other, their overlap degree β is expressed as:

$$\beta = 1 - \left(\frac{D_V}{S_V}\right), \tag{1-13}$$

wherein $D_v$ represents the spacing between the adjacent voxels, which is determined by Δx(k) and Δy(k) in the formula (1-5); given an overlap threshold $\beta_0$, depth positions of integral image planes at front and rear edges of the integral imaging 3D display within a 3D DOF range can be determined; an edge integral image plane closest to a viewer is referred to as a front edge integral image plane, and an edge integral image plane farthest from the viewer is referred to as a rear edge integral image plane; assuming that distances between the front edge integral image plane and the rear edge integral image plane and the micro-lens array plane are $z_1$ and $z_2$, respectively, the 3D DOF of the integral imaging 3D display is expressed as:

$$\Delta z = |z_1 - z_2| \tag{1-14}$$

therefore, based on the (S2-2), the front edge integral image plane and the rear edge integral image plane are selected according to 3D DOF requirements of the integral imaging 3D display and the overlap degree between adjacent voxels, such that a 3D image reconstructed between the front edge integral image plane and the rear edge integral image plane always maintains high clarity.

3. The method for integral imaging elemental image array generation based on optimal voxel space distribution according to claim 1, wherein the mapping relationship between the voxels and the homologous pixel points is expressed as:

$$F:Vx\rightarrow HomoPx, \quad (1\text{-}15)$$

wherein $V_x$ represents a voxel set, HomoPx represents a pixel set, and F represents a mapping function.

4. The method for integral imaging elemental image array generation based on optimal voxel space distribution according to claim 1, wherein a method for acquiring depth data and texture data of the 3D scene comprises: using a depth camera or 3D modeling software to obtain RGB-D images of the 3D scene, wherein the RGB-D images include depth data and texture data.

* * * * *